United States Patent [19]

Labana et al.

[11] 3,714,120

[45] Jan. 30, 1973

[54] COMPOSITION AND METHOD OF INCREASING THE REACTION RATE BETWEEN AN EPOXY RESIN AND AN AROMATIC AMINE

[75] Inventors: Santokh S. Labana, Dearborn Heights; Yun Feng Chang, Plymouth, both of Mich.

[73] Assignee: Ford Motor Company, Dearborn, Mich.

[22] Filed: April 13, 1971

[21] Appl. No.: 133,706

[52] U.S. Cl. ............. 260/47 EC, 260/2 EC, 260/59, 260/75 EP, 260/78.4 EP, 260/80.3 R
[51] Int. Cl. .................................................. C08g 30/14
[58] Field of Search ....... 260/2 EC, 47 EC, 59.75 EP, 260/78.4 EP, 88.3 A

[56] References Cited

UNITED STATES PATENTS 3,558,665  1/1971  Friedman et al. ........................ 260/2

OTHER PUBLICATIONS

C.A. (Chem. Abst.) Vol. 56 No. 10 p. 13099i, May 1962
Lee & Neville Handbood of Epoxy Resins (p. 16–19) 1967 (pp. 8–10 to 8–12).

*Primary Examiner*—William H. Short
*Assistant Examiner*—T. Pertilla
*Attorney*—John R. Faulkner and William E. Johnson

[57] ABSTRACT

A material which produces carboxylate radicals upon decomposition is added to a mixture of an epoxy resin and an aromatic amine in order to catalyze the same. When the mixture is heated to a temperature sufficient to decompose the catalyst material, the reaction rate between the epoxy resin and the aromatic amine is increased over that which would occur without such a catalyst material.

10 Claims, No Drawings

COMPOSITION AND METHOD OF INCREASING THE REACTION RATE BETWEEN AN EPOXY RESIN AND AN AROMATIC AMINE

BACKGROUND OF THE INVENTION

Aromatic amines are an important class of curing agents for epoxy resins especially for preparing solid molding compounds. Among their advantages over aliphatic amines are the development of higher heat distortion temperatures, longer shelf lives, and better chemical resistance. The reactions between aromatic amines and epoxy resins are, however, sluggish and require a catalyst material in order to develop cure times of a practical nature. A catalyst material is generally needed for such a reaction even at elevated temperatures.

The prior art teaches the use of a catalyst for the reaction between an aromatic amine and an epoxy resin. The prior art, however, has never instructed or taught that a free radical type initiator may be utilized in order to catalyze such a reaction. A number of catalysts such as borontrifluoride-amine complexes, phenols, and strong acids of inorganic nature have been reported to accelerate the reaction of aromatic amines with epoxy resins. However, none of these reported catalysts are of the so called free radical type initiators.

It has been found that a certain, selected type of free radical initiators are surprisingly effective to catalyze the reaction between an aromatic amine and an epoxy resin. The type of free radical initiator which may be so employed is one which generates carboxylate radicals upon decomposition. Other types of free radical initiators or catalysts, such as azo compounds, hydroperoxide, and dialkylperoxides which do not produce carboxylate radicals upon decomposition do not affect the rates of the reactions of aromatic amines with epoxy resins.

SUMMARY OF THE INVENTION

This invention is directed to a method of increasing the reaction rate between an epoxy resin and an aromatic amine. The invention is also directed to a new mixture as a composition of matter.

Aromatic amines are compounds in which amino groups are directly attached to an aromatic ring. The amines used in this invention may be monoamines of the general structure:

Ar – NHR

Where Ar is an aromatic group such as phenyl, naphthyl or anthracenyl and R is either hydrogen in the case of primary amines or an alkyl group in the case of secondary amines. The examples of aromatic monoamines include aniline, toluidine, naphthylamine, anthracenyl amine, N-Methylaniline, butylphenyl amine. The aromatic amines used in this invention may be diamines, i.e., they contain two amino groups per molecule. The diamines are of general structures:

RHN-Ar-NHR

RHN-Ar-Ar-NHR

RHN-Ar-X-Ar-NHR

Where Ar is aromatic ring system, R is hydrogen or an alkyl group and X is selected from O, S, $CH_2$, $SO_2$ or other divalent groups. Some of the examples of aromatic diamines are phenylenediamine; N,N'-dimethyl phenylenediamine; 4,4'-diaminobiphenyl; 3,3'-diamino biphenyl; 1,8-naphthylenediamine; 1,5-naphthylenediamine; N,N'-dimethyl - 4,4-diaminobiphenyl; methylenedianiline; N,N'-dimethyl methylenedianiline; 4,4'-diaminodiphenyl ether; 4,4'-diaminodiphenylsulfone; 4,4'-diaminodiphenyl sulfide; N,N'-dimethyl-4,4'-diaminodiphenyl ether.

The aromatic ring systems of aromatic amines may contain substituent groups such as alkyl, halogens, hydroxy, alkoxy or those containing sulfur atoms.

Epoxy resins are compounds which contain an oxygen atom connected to two adjacent carbon atoms. A variety of epoxy resins are known and commercially available. Among the important groups of epoxy resins are those based on bisphenol A (4,4'-Isopropylidine diphenol) and epicholorhydrin, novolacs and epichlorohydrin, aliphatic diepoxy ethers, aliphatic diepoxy esters and cycloaliphatic diepoxide.

Epoxy resins of the type of diglycidyl ethers of bisphenol A are most easily available under trade names of Epon 828, Epon 1001, Epon 1002, Epon 1004, Epon 1007 and Epon 1031 from Shell Chemical Co. They are also available from Dow Chemical Co. under the trade name of DER 332 or from Ciba Products Co. under the name of Araldite 6060. Their chemical structure can be represented by the following formula:

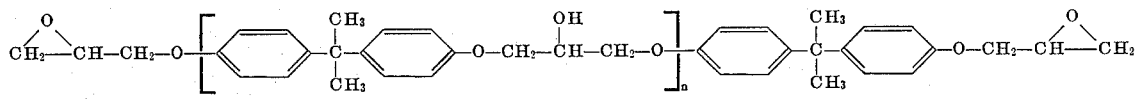

where n is 0, 1, 2, 3, 4, etc.

Novolac type epoxy resins are obtained by reacting novolacs, which are reaction products of phenol and formaldehyde, with epichlorohydrin and possess general structure shown below.

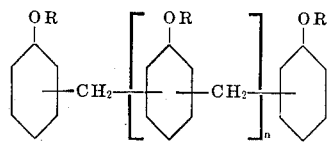

Where R is

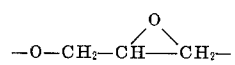

and n is 0, 1, 2, 3, etc.

Aliphatic ether type epoxy resins are of general structure:

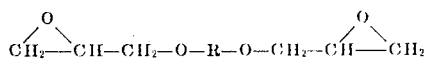

Where R is a divalent alkyl group. The above formula shows the epoxy resin to contain two epoxy group per molecule. Epoxy resins with more or less than two epoxy groups per molecule are also useful. An example of aliphatic ester type epoxy resin is diglycidyl adipate.

Cycloaliphatic type epoxy resins are those which contain oxygen atom attached to two adjacent carbon atoms which are part of a ring containing other carbon, nitrogen or sulfur atoms. Examples of cycloaliphatic epoxy resins are bis (2,3-epoxycyclohexanol) adipate, bis (2,3-epoxycyclopentyl) ether. A commercially available cycloaliphatic epoxy resin CY178 from Ciba Products Company is bis (2,3-epoxy-4-methylcyclohexanol) adipate.

Epoxy resins can also be prepared by copolymerization of unsaturated epoxy compounds such as glycidyl methacrylate with other vinyl monomers. The copolymerization conditions can be arranged to obtain the copolymers of widely different molecular weight, for example, in the range of 2000 to 100,000. The art of vinyl polymerization is well known and needs no further description here. The epoxy content of the copolymers is controlled by using appropriate amount of vinyl epoxy monomer, an example of which is glycidyl methacrylate, relative to the amount of other monomer or a mixture of monomers used. For example, epoxy equivalent weight varies between 200 and 5,000, if the copolymer contains between 71 percent and 2.8 percent respectively of glycidyl methacrylate.

Epoxy equivalent value of the epoxy resin is defined as number of grams of the resins which contain 1 mole of epoxy group. The epoxy equivalent value can be determined by titration procedure described by R. R. Jay in Analytical Chemistry, Volume 36, page 667 (1964).

Epoxy resins are described in detail in Handbook of Handbook of Epoxy Resins by H. Lee and K. Neville published by McGraw Hill Book Company of New York in 1967. The description and examples are given here only for the purpose of illustration and not for limitation.

The useful compounds of this invention which catalyze the reaction of an aromatic amine with an epoxy resin contain the following structural unit in their chemical structure.

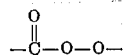

Among these compounds are acyl peroxide such as benzoyl peroxide, m-chloro benzoyl peroxide, lauryl peroxide, P-chloroperbenzoyl peroxide and dicyclohexylpercarbonate; or peresters such as t-butylperbenzoate, t-butyl-m-chloroperbenzoate, ethyl perbenzoate and t-butyl-m-nitroperbenzoate.

The method of increasing the reaction rate between an epoxy resin and an aromatic amine has the following steps. A small weight percentage of a material which produces carboxylate radicals upon decomposition is admixed to a mixture of an epoxy resin and an aromatic amine. The admixture is thereafter heated to a temperature sufficient to decompose the carboxylate radical producing material. The decomposition of the material catalyzes the reaction between the epoxy resin and the aromatic amine. In greater detail, the method consists of adding a small weight percentage of a free radical producing catalyst material selected from the group consisting essentially of acylperoxides and peresters which produce carboxylate radicals upon decomposition.

In still greater detail, the method of this invention increases the reaction rate between an epoxy resin and an aromatic amine at a selected temperature by the following steps. Approximately stoichiometric amounts of the epoxy resin and the aromatic amine are mixed at low temperature below the selected reaction temperature. To this mixture is admixed at about the low temperature a small weight percentage of a free radical initiator selected from the group consisting essentially of acylperoxides and peresters which produce carboxylate radicals upon decomposition at a temperature approximating the selected temperature. Thereafter, the materials are all heated to at least the selected temperature to decompose the free radical initiator material thereby to catalyze the reaction of the epoxy resin and the aromatic amine. The weight percent of the free radical catalyst may be from a minor amount of 0.02 weight percent up to about 2.0 weight percent. Also the catalyst material may be selected from the group consisting essentially of benzoylperoxide and t-butylperbenzoate. The reaction or selected temperature may be a temperature of at least 25°C.

The composition of matter formed in accordance with the teachings of this invention is a mixture containing an epoxy resin, an aromatic amine, and a material which produces carboxylate radicals when decomposed. In greater detail, the composition of matter contains a free radical initiator selected from the group consisting of acylperoxides and peresters and exist in the overall mixture in a weight percentage up to about 2.0 percent. In still greater detail, the composition of matter is one wherein the catalyst material is selected from the group consisting essentially of benzoylperoxide and t-butylperbenzoate.

DESCRIPTION OF THE PREFERRED EMBODIMENT

The method of this invention is demonstrated in the following examples. Also demonstrated in the following examples is the new composition of matter of this invention. In general, the invention relates to a method of increasing the reaction rate between an epoxy resin and an aromatic amine. The reaction is catalyzed by use of a free radial initiator material which produces carboxylate radicals upon decomposition. The carboxylate radicals affect the materials in such a manner that the polymer formed from the aromatic amine and the epoxy resin is formed at a more rapid rate than if the catalyst material was not present.

EXAMPLE 1

A weight amount of an epoxy resin Epon 828 manufactured by Shell Chemical Company was employed. This epoxy resin is a diglycidyl ether of bisphenol A with an epoxy equivalent weight of 190. The epoxy resin was heated to a temperature just above the melting point of 4,4-methylenedianiline (MDA). Stoichiometric amounts of the amine, to provide one amine hydrogen for each epoxy group, was added and stirred with the epoxy resin until completely dissolved. This mixture was cooled to room temperature. To this mixture no catalyst material was added. A sample of 50 mg of the mixture was placed on a hot plate and heated to a temperature of 160°C. A time of 5 minutes was observed to pass before the heated mixture developed a slight elasticity. This time was recorded as the "gel time" for the mixture.

EXAMPLE 2

All of the steps recited in Example 1 were repeated. However, to the mixture of the epoxy resin and the aromatic amine was added 2 percent by weight of benzoylperoxide. A 50 mg sample of the mixture was placed on the hot plate and heated to a temperature of 160°C. In this case, a "gel time" of 2.5 minutes was observed and recorded.

EXAMPLE 3

The steps outlined in Example 1 were repeated with the exception that m-phenylenediamine (MPDA) was used as the aromatic amine instead of MDA of Example 1. No catalyst was used. A 50 mg sample of the mixture was placed on the hot plate and heated at a temperature of 160°C. A "gel time" of 3.0 minutes was observed and recorded.

EXAMPLE 4

The steps of Example 3 were repeated with the single exception that 2 weight percent of t-butylperbenzoate which produces carboxylate radical upon decomposition was added to the epoxy resin and the aromatic amine prior to heating the same at 160°C. In this case, a "gel time" of 1.5 minutes was observed and recorded.

EXAMPLE 5

The steps of Example 3 were repeated with the single exception that a temperature of 120°C. was employed for heating the 50 mg sample. In this case, a "gel time"'of 12 minutes was observed.

EXAMPLE 6

The steps of Example 4 were repeated with the single exception that the heating temperature was 120°C. The observed "gel time" was 7.0 minutes.

EXAMPLE 7

An epoxy resin of the cycloaliphatic type, namely bis (2,3-epoxy-4methylcyclohexanol), with an epoxy equivalent weight of 213 marketed by Ciba Products Company as Araldite CY178 was employed as the epoxy resin. The aromatic amine employed was MDA. No catalyst was employed and the temperature to which the 50 mg sample of material was heated at 25°C. The observed "gel time" was 30,250 minutes.

EXAMPLE 8

The steps of Example 7 were repeated with the single exception that 2 percent by weight of t-butylperbenzoate was added to the mixture of the epoxy resin and the aromatic amine. This mixture was heated at 25°C. A "gel time" was observed of 5,760 minutes.

EXAMPLE 9

A copolymer of gylcidyl methacrylate and methyl methacrylate with an epoxy equivalent weight of 500 and an average number molecular weight of 4,000 was employed as the epoxy resin. To this epoxy resin, as in Example 1, the aromatic amine MDA was added in stoichiometric amounts. No catalyst was added. At a temperature of 160°C. a sample of 50 mg had a "gel time" of 6.0 minutes.

EXAMPLE 10

The steps of Example 9 were followed with the exception that 2 percent by weight of benzoylperoxide was added. At 160°C. a sample of 50 mg had a "gel time" of 1.5 minutes.

EXAMPLE 11

The steps of Example 9 were repeated with the single exception that 2.0 percent by weight of t-butylperbenzoate was added. A 50 mg sample of the mixture was heated at 160°C. A "gel time"of 1.5 minutes was observed.

EXAMPLE 12

The steps of Example 9 were repeated with the single exception that 2.0 weight percent of a known prior art catalyst borontrifluoride monoethylamine complex was added. A 50 mg sample of this misture was heated at a temperature of 160°C. A "gel time" of 1.5 minutes was observed and recorded.

EXAMPLE 13

The process steps of Example 9 were repeated with the single exception that 2 weight percent of 2,2'(2-methyltropionitrile) which does not produce carboxylate radicals was added. A 50 mg sample of the mixture was heated at a temperature of 160°C. A "gel time" of 6.0 minutes was observed and recorded.

EXAMPLE 14

The steps of Example 9 were repeated with the single exception that 2.0 weight percent of cumene hydroperoxide which does not produce carboxylate radicals was added to the mixture. A 50 mg sample of the mixture was heated at 160°C. A "gel time" of 6.0 minutes was observed and recorded.

EXAMPLE 15

The steps of Example 9 were repeated with the single exception that 2.0 weight percent of dicumenyl peroxide which does not produce carboxylate radicals was added to the mixture. A 50 mg sample of the mixture was heated at a temperature of 160°C. A "gel time" of 6.0 minutes was observed and recorded.

Example 16

The steps of Example 1 were repeated with the following exceptions. The epoxy resin employed was an epoxy of the type formed from a diglycidyl ether of bisphenol A with an epoxy equivalent weight of 178. This material was purchased from Dow Chemical Company and is identified as DER332. MDA aromatic amine was added in stoichiometric amounts as described in Example 1. No catalyst material was added. When this epoxy resin and aromatic amine was heated at a temperature of 120°C. A "gel time" of 15.5 minutes was observed and recorded.

EXAMPLE 17

The steps of Example 16 were repeated with the single exception that 0.5 percent by weight of t-butylperbenzoate was added. A 50 mg sample of the mixture was heated at 120°C. A "gel time" of 11.0 minutes was observed and recorded.

EXAMPLE 18

The steps of Example 17 were repeated with the single exception that 1.0 weight of t-butylperbenzoate was added. When a 50 mg sample of this mixture was heated at 120°C., a "gel time" of 9.6 minutes was observed and recorded.

EXAMPLE 19

The steps of Example 17 were repeated with the single exception that 2.0 weight percent of t-butylperbenzoate was added. When a 50 mg sample of the mixture was heated at 120°C., a "gel time" of 7.0 minutes was observed and recorded.

EXAMPLE 20

The steps of Example 16 were repeated with the single exception that a temperature of 160° was employed for heating the mixture instead of 120°. A "gel time" of 4.6 minutes was observed and recorded.

EXAMPLE 21

The steps of Example 20 were repeated with the single exception that 0.5 weight percent of t-butylperbenzoate was added. When a 50 mg sample of this material was heated at a temperature of 160°C., a "gel time" of 3.3 minutes was observed and recorded.

EXAMPLE 22

The steps of Example 21 were repeated with the single exception that 1.0 weight percent of t-butylperbenzoate was employed. When a 50 mg sample of the material was heated at a temperature of 160°C., a "gel time" of 2.7 minutes was observed and recorded.

EXAMPLE 23

The steps of Example 21 were repeated with the single exception that 2.0 weight percent of t-butylperbenzoate was employed. When a 50 mg sample of the mixture was heated at a temperature of 160°C., a "gel time" of 2.1 minutes was observed and recorded.

All of the Examples and processing conditions are summarized in Table I.

TABLE I

Effect of Catalyst on Gel Times of Epoxy Resins with Aromatic Amines

| Example | Epoxy Resin | Amine | Catalyst Name | Wt% | Temp (°C) | Gel Time (min.) |
|---|---|---|---|---|---|---|
| 1 | Epon 828 | MDA | None | | 160 | 5.0 |
| 2 | " | " | benzoylperoxide | 2 | " | 2.5 |
| 3 | " | MPDA | None | | " | 3.0 |
| 4 | " | " | t-butylperbenzoate | | " | 1.5 |
| 5 | " | " | None | | 120 | 12.0 |
| 6 | " | " | t-butylperbenzoate | 2 | " | 7.0 |
| 7 | Araldite CY 178 | MDA | None | | 25 | 30,250 |
| 8 | " | " | t-butylperbenzoate | 2 | " | 5,760 |
| 9 | Glycidyl methacrylate copolymer | " | None | | 160 | 6.0 |
| 10 | " | " | benzoylperoxide | 2 | " | 1.5 |
| 11 | " | " | t-butylperbenzoate | 2 | " | 1.5 |
| 12 | " | " | $BF_3C_6H_5NH_2$ | 2 | " | 1.5 |
| 13 | " | " | AIBN | 2 | " | 6.0 |
| 14 | " | " | cumene hydroperoxide | 2 | " | 6.0 |
| 15 | " | " | dicumylperoxide | 2 | " | 6.0 |
| 16 | DER 332 | " | None | | 120 | 15.5 |
| 17 | " | " | t-butylperbenzoate | 0.5 | " | 11.0 |
| 18 | " | " | " | 1 | " | 9.6 |
| 19 | " | " | " | 2 | " | 7.0 |
| 20 | " | " | None | | 160 | 4.6 |
| 21 | DER 332 | MDA | t-butylperbenzoate | 0.5 | 160 | 3.3 |
| 22 | " | " | " | 1 | " | 2.7 |
| 23 | " | " | " | 2 | " | 2.1 |

From the various Examples and Tables presented above it can readily be appreciated that a decrease was accomplished in the "gel time" between the aromatic amine and the epoxy resin by employment of a catalyst material. In accordance with the teachings of this invention, the catalyst material is one which is capable of producing carboxylate radicals upon decomposition. Many known free radical initiators were also shown not to catalyze these reactions because such catalysts are not capable of producing the carboxylate radical upon decomposition.

We claim:

1. A method of increasing the reaction rate between an epoxy resin and a primary or a secondary aromatic amine which comprises the steps of: admixing with a mixture of the epoxy resin and the aromatic amine 0.02 to 2.0 weight percentage of a material selected from the group consisting of acyl peroxides and peresters which produce carboxylate radicals upon decomposition, and heating said admixture to a temperature sufficient to decompose said radical producing material.

2. A method of increasing the reaction rate between an epoxy resin and a primary or a secondary aromatic amine at a selected temperature which comprises the steps of: admixing at a low temperature below said selected temperature with a mixture of the epoxy resin and the aromatic amine 0.02 to 2.0 weight percentage of a catalyst material selected from the group consisting of acyl peroxides and peresters which produce carboxylate radicals upon decomposition at a temperature approximating said selected temperature and heating said admixture to said selected temperature to decompose said catalyst material.

3. A method of increasing the reaction rate between an epoxy resin and a primary or a secondary aromatic amine at a selected temperature which comprises: mixing approximately stoichiometric amounts of said epoxy resin and said aromatic amine at a low temperature below said selected temperature; admixing to said mixture at about said low temperature 0.02 to 2.0 weight percentage of a catalyst material selected from the group consisting of acyl peroxides and peresters which produce carboxylate radicals upon decomposition at a temperature approximating said selected temperature; and heating said admixture to at least said selected temperature to decompose said catalyst material.

4. As a composition of matter a mixture comprising approximately stoichiometric amounts of an epoxy resin and a primary or a secondary aromatic amine, and a 0.02 to 2.0 weight percentage of a catalyst material, selected from the group consisting of acyl peroxides and peresters which produces carboxylate radicals when decomposed.

5. The method as defined in claim 3 wherein said catalyst material is benzoylperoxide.

6. The method as defined in claim 3 wherein said catalyst material is t-butylperbenzoate.

7. The method as defined in claim 3 wherein said selected temperature is at least 25°C.

8. A method increasing the reaction rate between an epoxy resin selected from the group consisting of diglycidyl ethers of bisphenol A having epoxy equivalent weights in the range of 160 to 2,500, a cycloaliphatic epoxy; and a copolymer of glycidyl methacrylate and methyl methacrylate having an epoxy equivalent weight in the range of 200 to 5,000 and a number average molecular weight in the range of 2000 to 100,000 and an aromatic amine selected from the group consisting of 4,4' methylenedianiline and m-phenylenediamine at a selected temperature which comprises: mixing approximately stoichiometric amounts of said epoxy resin and said aromatic amine at a low temperature below said selected temperature; admixing to said mixture at about said low temperature 0.02 to 2.0 weight percentage of a catalyst selected from the group consisting of benzoylperoxide and t-butylperbenzoate which produce carboxylate radical upon decomposition at a temperature approximating said selected temperature; and heating said admixture to at least said selected temperature to decompose said catalyst material.

9. The method as defined in claim 8 wherein said weight percentage of said catalyst is about 2 percent and wherein said selected temperature is at least 120°C.

10. The composition of matter defined in claim 4 wherein said catalyst material is selected from the group consisting of benzoylperoxide and t-butylperbenzoate.

* * * * *